June 16, 1931.   L. ALIG   1,810,154
MECHANICAL MOVEMENT
Filed July 7, 1930   2 Sheets-Sheet 1
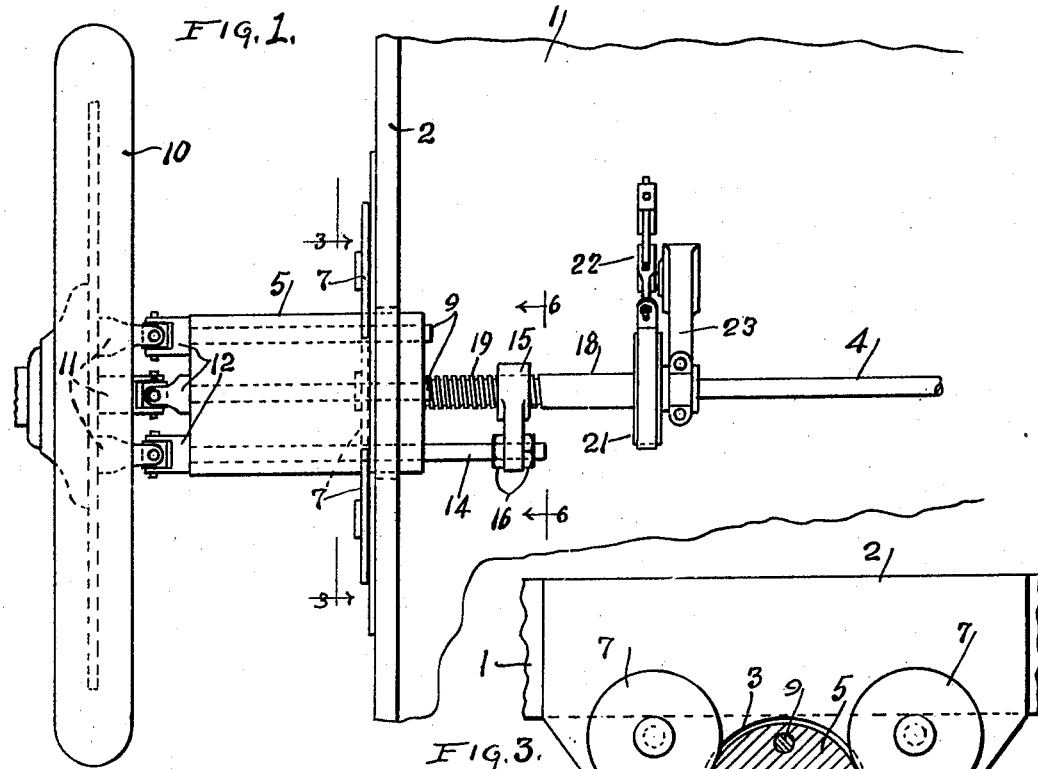
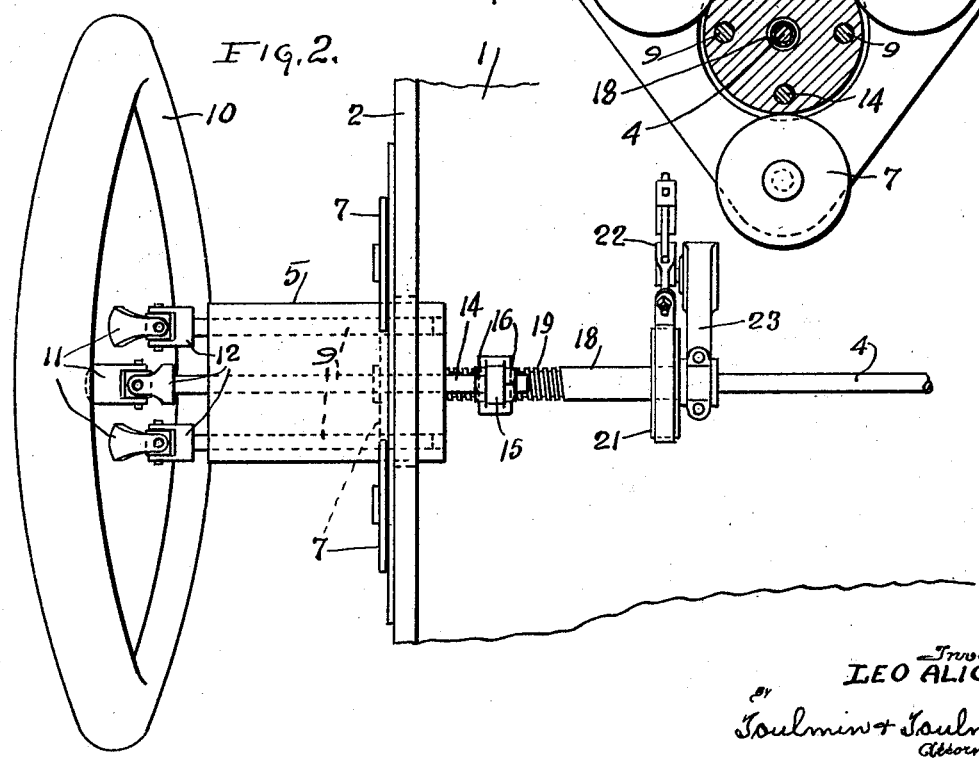
Inventor
LEO ALIG,
by Toulmin & Toulmin
Attorneys June 16, 1931.  L. ALIG  1,810,154
MECHANICAL MOVEMENT
Filed July 7, 1930   2 Sheets-Sheet 2
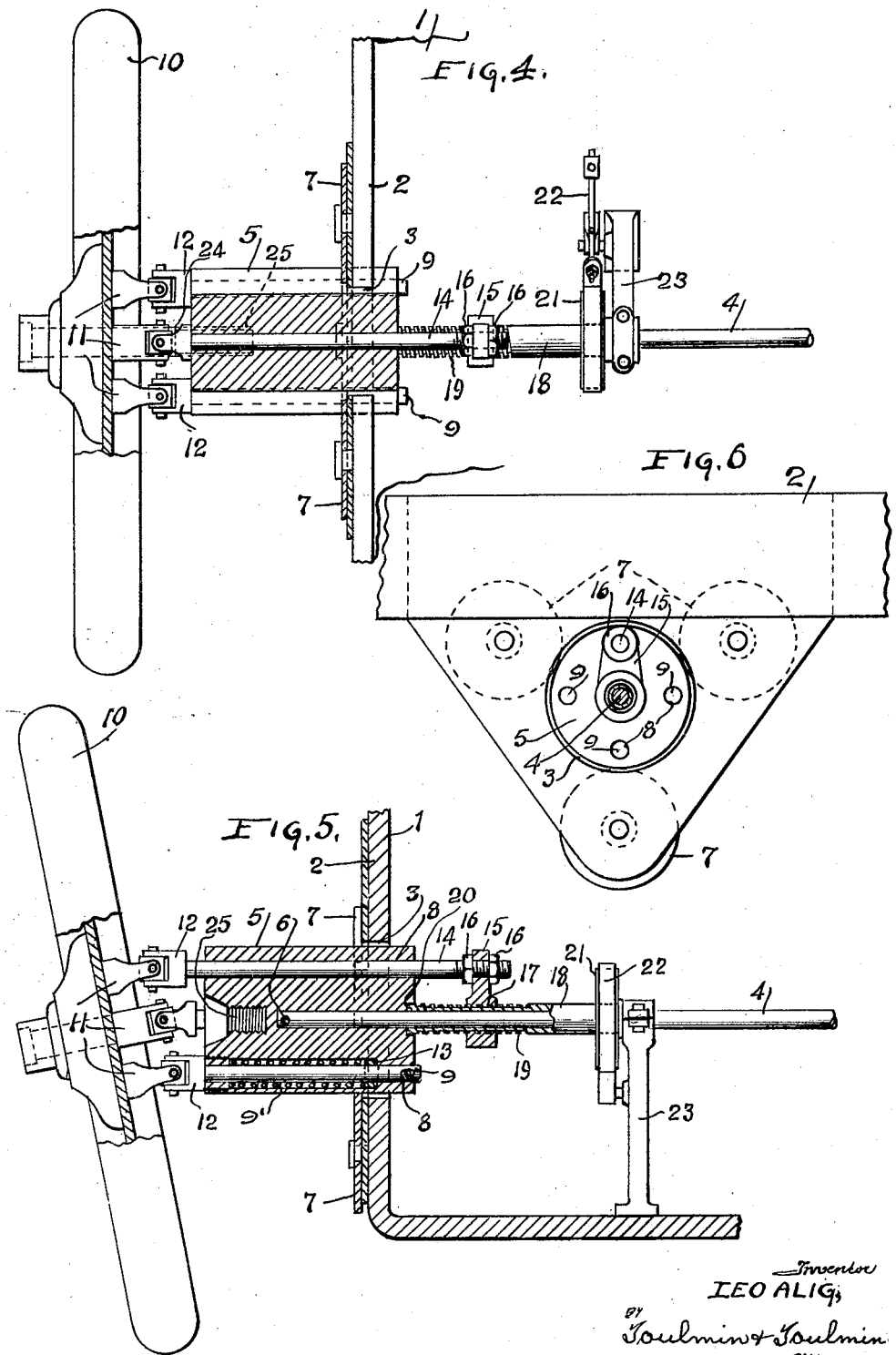

Patented June 16, 1931

1,810,154

UNITED STATES PATENT OFFICE

LEO ALIG, OF DAYTON, OHIO

MECHANICAL MOVEMENT

Application filed July 7, 1930. Serial No. 466,011.

This invention relates to improvements in mechanical movements, and especially in mechanical movements adapted to be used in connection with discs or wheels attached to a combination automobile and boat for the purpose of propelling the vehicle both on land and in the water.

It is the object of this invention to provide, in connection with an attachment adapted to be used on a combination automobile and boat, a disc and means for supporting the disc in such a way that it may be held in two positions. In one position the disc acts as a wheel whereas in the other position it serves as a propeller to propel the vehicle in water.

It is also an object of this invention to provide, in connection with an attachment of this kind, means for shifting the disc from a vertical position to an inclined position with regard to its axis of support.

It is also an object of this invention to provide means for shifting the disc from one position to another by the rotation of the disc.

These and other advantages will appear from the description taken in connection with the drawings.

Referring to the drawings:

Figure 1 is a top plan view showing a propeller disc adapted to be used as a wheel or as a water propeller. In this figure the disc is in the vertical land traveling position.

Figure 2 shows the disc inclined to its axis of rotation and in a position for propelling the vehicle as a boat.

Figure 3 is a section on the line 3—3 of Figure 1.

Figure 4 is a section showing the means by which the disc is shifted from vertical to inclined or from inclined to vertical positions.

Figure 5 is a vertical sectional view on the line 5—5 of Figure 1.

Figure 6 is a section of the line 6—6 of Figure 1.

The numeral 1 is used to designate a frame adapted to support a disc for use as a wheel or propeller. In the present instance this frame consists of a sheet of metal turned up at one end to form a bracket 2. The bracket has extending therethrough a hole or opening 3. Extending through the central part of this opening and parallel with the main body of the frame is a shaft 4, which has on one end thereof a drum 5. This drum fits within the hole 3 and is guided by rollers 7, located on the bracket 2.

The drum is fastened to the shaft by means of a pin 6. The drum and the shaft are located within the hole and are supported therein by means of these rollers 7, which engage the periphery of the drum and serve as an antifriction bearing for the drum during the operation of the shaft and the wheel or disc on the end thereof. The drum has extending longitudinally adjacent the periphery thereof a plurality of holes 8. In the present instance there are four of these holes, in which there are located rods 9. One of these rods 9 is held in its hole substantially against longitudinal movement. However, there is provided within the hole and around one rod 9 a spring 9', which allows this rod to have a limited longitudinal movement. This rod has formed near one end thereof a bead 13 against which one end of the spring abuts, while the other end of the spring abuts against a shoulder formed in one of the holes. The movement of this rod is further limited by a pin and slot structure 9'.

The numeral 10 indicates a wheel. On this wheel adjacent the center thereof are four lugs 11. These lugs are attached to the ends of the rods 9 by means of universal joints 12. The wheel 10 is shifted from vertical position by means of one of the rods 9. This rod extends beyond the drum, as indicated by the numeral 14, and has attached thereto an arm 15 by means of nuts 16.

The arm 15, which is attached at one end to the extension 14, has in the other end a threaded hole 17 in which is threaded an externally threaded sleeve 18. This sleeve is located around the shaft 4 and has threads 19 engaging the threaded hole 17. One end 20 of this sleeve projects slightly into the drum and is held therein by means of a post 23, which forms a support and bearing for the shaft 4 so that it may freely rotate in relation to the drum but cannot move longitudinally in relation thereto. The outer end of the sleeve has a brake disc 21 thereon, which is adapted to be clutched by means of a clutch mechanism 22 for locking the sleeve against rotation. The clutch mechanism is supported by the post 23.

In Figure 1 the apparatus is shown in position to be used for conveying a land vehicle. For the purpose of rotating the wheel, power is applied in some suitable manner to the rod or shaft 4. This shaft 4 rotates and carries with it the drum 5 and the wheel 10. The wheel in the position shown in Figure 1 is for land transportation and remains in this position until the arm 15 is shifted along the sleeve 18. For holding the disc in a vertical position a screw 24 may be inserted through the center of the disc into a threaded socket 25 in the hub 5. In order to shift this arm along the sleeve and thereby convert the wheel from a land supporting wheel to a water propeller the shaft 4 is caused to rotate the same as usual, but by means of the clutch mechanism shown in Figures 1 and 3 the sleeve is prevented from rotation.

As the wheel, drum and arm 15 rotate the arm travels on the sleeve so that the rod 9 having the extension 14 thereon moves outwardly, so that the wheel is shifted from vertical to an inclined position, shown in Figure 2. This change is effected by causing the arm 15 to move from the position shown in Figure 1 to the position shown in Figure 3, in which the arm is nearer the drum. In order to shift the wheel from an inclined position, such as shown in Figure 2, the shaft is rotated in the reverse direction, thereby removing the arm from a position adjacent the drum to the position shown in Figure 1.

It will be observed that all of these changes of position in the wheel are effected by the driving or propelling power attached to the shaft 4. The changes are effected merely by shifting the clutch either into or out of engagement with the clutch disc.

I desire to comprehend within my invention such modifications as may be clearly embraced within my claims and the scope of my invention.

Having thus fully described my invention, what I claim is new and desire to secure by Letters Patent, is:

1. In a mechanical movement for operating a disc as a boat propeller and vehicle wheel, means to support said disc for rotation, and means for holding said disc in a vertical plane and shifting the disc out of the vertical plane and holding it so.

2. In a mechanical movement for operating a disc as a combination boat propeller and vehicle wheel, means to support and rotate said disc, and means to shift the angular position of said disc and hold the disc in the required angular position.

3. In a mechanical movement for operating a disc as a combination boat propeller and vehicle wheel, means to support and rotate said disc, and means operated by the rotation of the disc to shift the angular position of said disc and hold it in position.

4. In a mechanical movement for operating a disc as a combination boat propeller and vehicle wheel, a rotatable shaft to which the disc is pivotally attached, and means operated by the rotation of the shaft to move the disc on its pivot.

5. In a mechanical movement for operating a disc as a combination boat propeller and vehicle wheel, a rotatable shaft to which the disc is pivotally attached and rotatable therewith, means operated by the shaft for moving the disc on its pivot, and means engaging the shaft to hold the disc against movement on its pivot.

6. In a mechanical movement for operating a disc as a combination boat propeller and vehicle wheel, a rotatable shaft having the disc pivotally attached to one end and rotatable therewith, a sleeve on said shaft, and means operated by the sleeve on the rotation of the shaft to move the disc on its pivot.

7. In a mechanical movement for operating a disc as a combination boat propeller and vehicle wheel, a rotatable shaft having the disc pivotally attached to one end and rotatable therewith, a sleeve on said shaft adapted to rotate therewith, a connection between the disc and the sleeve, and means to lock the sleeve against rotation with the shaft whereby when the shaft is rotated the disc is moved on its pivot.

8. In a mechanical movement for operating a disc as a combination boat propeller and vehicle wheel, a rotatable shaft having the disc pivotally attached to one end and rotatable therewith, an externally threaded sleeve on said shaft adapted to rotate therewith, an arm threaded on said sleeve and connected to the disc, and means to lock the sleeve against rotation with the shaft whereby when the shaft is rotated the disc is moved on its pivot.

9. In a mechanical movement for operating a disc as a combination boat propeller and vehicle wheel, a rortatably mounted shaft having the disc pivotally attached to one end and rotatable therewith, an externally threaded sleeve on said shaft adapted to rotate therewith, an arm threaded at one end on said sleeve and connected at the other end to the disc, and means to lock the sleeve against rotation with the shaft whereby when the shaft is rotated the disc is moved on its pivot.

10. In a mechanical movement for operating a disc as a combination boat propeller and a vehicle wheel, a rotatably mounted shaft having a drum thereon, said drum having the disc pivoted to one end adjacent one side for rotation therewith and a longitudinal hole in the opposite side, a rod in said hole pivoted at one end to the disc, and means operated by the rotation of the shaft and attached to said rod for moving the disc on its pivot.

11. In a mechanical movement for operating a disc as a combination boat propeller and a vehicle wheel, a rotatably mounted shaft having a drum on one end, said drum having a longitudinal hole in each of opposite sides, a rod in each hole pivoted at one end to the disc, one rod being fixed in its hole and the other movable, and means operated by the rotation of the shaft to move the movable rod to tilt the disc on the other rod.

12. In a mechanical movement for operating a disc as a combination boat propeller and a vehicle wheel, a rotatable shaft having the disc pivoted on one end for rotation therewith, said disc being adapted to have a position at right angles to the shaft and one at an oblique angle thereto, and means operated by the rotation of the shaft for shifting the disc from one position to the other and holding it in that position.

13. In a mechanical movement for operating a disc as a combination boat propeller and a vehicle wheel, a rotatable shaft having the disc pivoted on one end for rotation therewith, said disc being adapted to have a position at right angles to the shaft and one at an oblique angle thereto, and means connected at one end to the shaft and at the other end to the shaft and operated by the rotation of the shaft for shifting the disc from one position to the other and holding it in that position.

14. In a mechanical movement for operating a disc as a combination boat propeller and a vehicle wheel, a rotatable shaft having the disc pivoted on one end for rotation therewith, said disc being adapted to have a position at right angles to the shaft and one at an oblique angle thereto, a rod slidably supported by the shaft and pivotally connected at one end to the disc, and means operated by the rotation of the shaft and connected to the other end of the rod for shifting the disc from one position to the other and holding it in that position.

15. In a mechanical movement for operating a disc as a combination boat propeller and a vehicle wheel, a rotatably mounted shaft having a drum on one end, said drum having a longitudinal hole in each of opposite sides, a rod in each hole attached to the disc, one rod having a resilient connection with the drum and the other freely movable in its hole, and means to move the freely movable rod to move the disc relative to the drum.

16. In a mechanical movement for operating a disc as a combination boat propeller and a vehicle wheel, a rotatably mounted shaft having a drum on one end, a resiliently mounted member in one side of said drum to which the disc is attached, and a longitudinally movable member in another side of said drum to which the disc is attached for shifting the disc in relation to the drum.

17. In a mechanical movement for operating a disc as a combination boat propeller and a vehicle wheel, a rotatably mounted shaft having a drum thereon, a plurality of longitudinally movable members in said drum pivoted to said disc for supporting it on the drum and shifting it in relation to the drum.

18. In a mechanical movement for operating a disc as a combination boat propeller and a vehicle wheel, a rotatably mounted shaft having a drum thereon, means on one end of the drum adjacent one side for pivotally supporting the disc, and means extending through the drum and attached to the disc for causing the disc to rotate with the drum and to shift the disc on its pivot.

In testimony whereof, I affix my signature.

LEO ALIG.